United States Patent [19]
Chatlos

[11] Patent Number: 4,503,756
[45] Date of Patent: Mar. 12, 1985

[54] ATTACHMENT FOR MOTOR VEHICLES WITH REAR WINDOWS

[75] Inventor: Richard Chatlos, Johnstown, Pa.

[73] Assignee: Air-O-Scoop Corporation, Johnstown, Pa.

[21] Appl. No.: 514,198

[22] Filed: Jul. 15, 1983

Related U.S. Application Data

[63] Continuation-in-part of Ser. No. 377,564, May 12, 1982, Pat. No. 4,393,753, Continuation of Ser. No. 194,224, Oct. 6, 1980, Pat. No. 4,346,648, Continuation-in-part of Ser. No. 118,444, Feb. 4, 1980, Pat. No. 4,326,451.

[51] Int. Cl.$^3$ ............................................... B60J 1/20
[52] U.S. Cl. ...................................... 98/2.12; 98/99.3
[58] Field of Search ............... 98/2, 2.12, 2.13, 2.18, 98/2.19, 99.3, 99.4

[56] References Cited

U.S. PATENT DOCUMENTS

| | | | |
|---|---|---|---|
| 362,051 | 5/1887 | Addoms | 98/99.3 |
| 488,920 | 12/1892 | Cook | 98/99.3 |
| 1,809,518 | 6/1931 | Kubatzky | 98/99.3 X |
| 2,347,120 | 4/1944 | Mohun | 98/99.3 |
| 2,570,337 | 10/1951 | Gallik | 98/2.13 |
| 3,440,945 | 4/1969 | Mura | 98/2.19 X |

FOREIGN PATENT DOCUMENTS 519679  9/1938  United Kingdom .

*Primary Examiner*—Harold Joyce
*Attorney, Agent, or Firm*—Fisher, Christen & Sabol

[57] ABSTRACT

An air flow device for a closed motor vehicle or boat for positioning in the rear aperture thereof which includes structure for attaching the air flow device to the rear aperture. There is a plate which is transparent in at least the central region thereof. The attachment structure, which includes a pivot means, is pivotally attached to the bottom portion of the plate and to the lower rim of the aperture. There are two vertical side members, each of which is attached to an end of the plate so as to extend outwardly from the plate. Each of the vertical side members is in sliding relationship with one of the vertical sides of the rear aperture and/or of window glass mounted therein. There are two narrow end members, each of which is attached to an unoccupied end of one of the vertical side members and extends away from the plate. When the plate is in an upright position so as to close the rear aperture, the vertical side members extend outwardly from the rear aperture of the vehicle. When the plate is in an inwardly pivoted position so as to extend upwardly and inwardly from the rear aperture, thereby forming a gap between the top of the plate and the vertical plane of the rear aperture, the vertical side members extend inwardly from the rear aperture thereby preventing lateral air flow into the vehicle. The end members prevent the inwards pivoting of the device beyond the outer edges of the side members.

7 Claims, 4 Drawing Figures

ATTACHMENT FOR MOTOR VEHICLES WITH REAR WINDOWS

This is a continuation-in-part of application Ser. No. 377,564, filed on May 12, 1982 now U.S. Pat. No. 4,393,753, which is a continuation of application Ser. No. 194,224, filed on Oct. 6, 1980, now U.S. Pat. No. 4,346,648, issued on Aug. 31, 1982, which is a continuation-in-part of application Ser. No. 118,444, filed on Feb. 4, 1980, now U.S. Pat. No. 4,326,451, issued on Apr. 27, 1982.

BACKGROUND OF THE INVENTION

1. Field Of The Invention

This invention relates to the field of ventilators or air flow devices of motor vehicles.

2. Prior Art

When the rear cab window of a pick-up truck or the like is open, the flow of air can cause soreness of the neck and arms and blow a person's hair. The elimination of these disadvantages and occupant annoyances has been the objective of prior, but unsuccessful inventors, as often the best previous solution had been to shut the rear cab window.

Some of the prior art ventilators allowed the entry of water into the cab or motor coach during rainstorms.

U.S. Pat. No. 1,895,109 (Suddards) teaches a ventilator for the rear window of a closed motor cab, coach and the like. The ventilator has a louver for positioning in the aperture usually occupied by the rear light or rear window. The louver is a number of strips pivotally mounted, each about one edge and operatively connected for movement together. The ventilator also has a deflector screen associated with the louver so as to provide an opening at its upper position. There is a movable flap for controlling the flow of air through the ventilator. The movable flap is mounted for pivotal movement with its free edge cooperating with the upper edge of the deflector screen.

The deflector screen of Suddards is positioned on the inside of the car and the louver is positioned on the outside of the car. Suddards states that its air flow pattern is from inside of the car to outside of the car. To achieve this flow path, it is quite apparent that Suddards would have to open at least one side or front window, at least partially. Flaps or strips D cannot rise above the horizontal due to the top frame of the ventilator, due to the central pivot mounting of the flaps and due to connecting bar F. Since Suddards states his air flow path is from inside of the car outwards, there is no need or desire for flaps D to rise above the horizontal.

Flaps D of Suddards, which do not rise above the horizontal, would effectively render the air flow device of this invention useless by blocking the air flow from over the top of the car, down the back of the car and around, up and through the air flow device of this invention. Suddards asserts an air flow through its ventilator from inside of the car to the outside. Glass louvers present a safety problem for a person riding in the bed of a pick-up truck. Where a camper is mounted in the bed of a pick-up truck, the louvers would totally block air flow and may not even fully open.

Suddards does not have any side panels, which allow air flow through the truck at head and shoulder level of the driver or passenger. This would cause sore arms, neck, etc., and blown hair.

In Suddards, since its ventilator has no side panels, the louver (flaps) must be closed to keep water and snow out. The mounting or installation of Suddards' ventilator would not be easy. There would be poor air quality in a vehicle having Suddards' ventilator. Suddards' ventilator would not be maintenance free, would not be easy to install or would not be easy to remove or clean. In modern vehicles, the rear window is designed altogether differently, making it difficult to install Suddards' ventilator. Suddards' ventilator is not applicable for current recreation vehicles—the design of windows and/or rear windows makes Suddards' ventilator non-applicable for the current design of such windows. Suddards' ventilator has no removable openings or louver flaps for rear view.

In order for passengers to ride in a recreation camper of a pick-up truck, there should be communication with the cab of the recreation vehicle as well as with those in the recreation camper. With the Suddards' louvers, state and federal regulations would not permit louvers in a rear light or rear window of such recreation vehicle and camper. Louvers in a recreation vehicle would hinder communication with passengers in the recreation camper.

U.S. Pat. No. 3,303,769 (Williams) discloses a device for insertion in the front window of a trailer or the like. The device has a transparent window having its upper edge swingably connected to the trailer at the upper edge of front window (or aperture) and extending downwardly and outwardly from the trailer. Williams has specifically designed its system to prevent dust coming into the trailer by keeping a positive pressure in the trailer and filtering the incoming air flow. But the Williams device has a number of problems or disadvantages. Carbon monoxide and other noxious and toxic gases from the exhaust of the pulling car will be swept right into the trailer through the front window ventilator window of the Williams device. Also, when it starts to rain, the rain water is thrown up by the car wheels, etc., and will be sucked right into the trailer through the front window ventilator of the Williams device.

U.S. Pat. No. 2,925,769 (Kubatzky) shows a modified casement window for basements and the like. Kubatzky does not involve a moving vehicle which normally will have a wind factor of up to 55 m.p.h. due to the movement of the motor vehicle. The ventilation problems of a moving vehicle and a stationary basement are hardly related even in concept. Kubatzky deals with a device with which no air flow is involved. Condensation is a problem for Kubatzky. Kubatzky does not specify any kind of air flow and water runoff. In Kubatzky's ventilating window were left open in a rainstorm, water trouble would occur. There is nothing to prevent foreign matter from entering the Kubatzky device. When the deflecting shield is open and with wings extending out, the ventilating window is wide open at the top, thus allowing water, bugs, or anything else to enter. In Kubatzky the wings are adjustable, which would cause a rattle in a moving vehicle. Also, there is a strong possibility that water would enter due to the wings of the Kubatzky device.

BROAD DESCRIPTION OF THE INVENTION

An object of the invention is to provide a new and improved air flow device for the rear aperture of motor vehicles. Other objects and advantages of the invention are set out herein or are obvious herefrom to one ordinarily skilled in the art.

The objects and advantages of the invention are achieved by the device of the invention.

The invention involves an air flow device for a closed motor vehicle or boat for positioning in the rear aperture thereof. The air flow device of the invention is a permanently installed and air controlled device. The air flow device includes means for attaching the air flow device to the rear aperture. There is a plate which is pivotally attached on its bottom portion to the pivoting means. The attachment means, which includes a pivot means, is pivotally attached to the bottom portion of the plate and to the lower rim of the aperture. The plate is transparent in at least the central region thereof. There are two vertical side members, each of which is attached to an end of the plate so as to extend outwardly from the plate. Each of the vertical side members is in sliding relationship with one of the vertical sides of the rear aperture and/or of window glass mounted therein. There are two narrow end members, each of which is attached to an unoccupied end of one of the vertical side members and extends away from the plate. When the plate is in an upright position so as to close the rear aperture, the vertical side members extend outwardly from the rear aperture of the vehicle. When the plate is in an inwardly pivoted position so as to extend upwardly and inwardly from the rear aperture, thereby forming a gap between the top of the plate and the vertical plane of the rear aperture, the vertical side members extend inwardly from the rear aperture thereby preventing lateral air flow into the vehicle. The end members prevent the inwards pivoting of the device beyond the outer edges of the side members.

Preferably the air flow device has two narrow side wings, each of which is attached to one end of the plate member and extends away from the plate. When the plate is in an upright position, the two narrow side wings prevent the outwards movement of the device beyond the inner edges of the narrow side wings.

When the rear cab window of a pick-up truck or the like is open, the flow of air can cause soreness of the neck and arms and blow a person's hair. These disadvantages and occupant annoyances are eliminated by the device of the invention without having to shut the rear vehicle window.

When the device of the invention is installed in the rear cab window, the window can be left open during rainstorms. Even during a severe rainstorm lasting several hours, no water will enter the cab of the vehicle from the opened rear window. The side windows can be practically shut (or open about ½ inch on each side) during rainstorms, with the result that the side and rear windows and windshield will not fog. The air temperature in the cab will remain comfortable without the use of an air conditioner or dehumidifier. The use of the invention allows one to continue driving during a rainstorm while other vehicles have to pull off the road.

The invention system is designed to provide a comfortable air flow for vehicle occupants. When the invention device is used in the back window of a trailer or a pulling vehicle, even a van, carbon monoxide and other noxious and toxic gases from the exhaust of the pulling vehicle are not swept into the trailer or the pulling vehicle through the back window thereof containing the window device. The invention device does not need screens to protect it from a stone thrown up by vehicle tires and does not need springs. Also, the invention device does not have any condensation problem. The sides or wings of the invention add strength to the shield (center plate) and prevent water and foreign matter from entering the vehicle.

The invention involves a moving vehicle which normally will have a wind factor of up to 55 m.p.h. due to the movement of the motor vehicle. The ventilation of moving vehicles presents special problems. The invention device is positioned, in use, in a moving object and provides a flow of air directed over the heads of driver and passenger for comfort. There is no comparison between a basement ventilating (casement) window and the invention air flow device. The air flow of a device such as that of Kubatzky would not be practicable for the driver and passenger of a pick-up truck with sliding glass windows.

The air flow device of the invention can be made out of all plastic or out of all aluminum or out of all metal or combined plastic with aluminum or plastic with metal. It can be produced out of an aluminum frame with center made of a durable transparent plastic or glass. Its basic materials are aluminum or plastic or both combined or metal combined plastic with aluminum or plastic with metals. It is lightweight in nature and durable—this feature makes it maintenance free. The nature of the air flow device makes it simple to install. The air flow device allows air to flow in the vehicle without hindering passengers riding in the vehicle. The air flow device allows air to be distributed in vehicle or recreation vehicle which results in making the driver and/or passengers very comfortable. It is preferable that the entire back plate of the air flow device be constructed of clear plastic so as to give the driver of the vehicle a clear view of rear traffic. The center of or the entire back plate should be made of a clear durable plastic in order for the air flow device to pass stage and federal inspections. Since some vehicles contain a closed-in camper, the sight from the rear view mirror is obstructed on such type of vehicle and is replaced by side view mirrors. It would be up to the choice of the owner if he desires the air flow device to be all aluminum or all plastic model or metal or a combination of all three. The air flow device can be designed and constructed to accommodate all vehicles and/or recreation vehicles with a rear window. At the top of the air flow device, when it is in the open position, where the air enters the vehicle, a screen can be inserted to prevent foreign matter or insects from entering the vehicle.

Permanent installation of the air flow device in a rear window can be done in several ways. The owner of the vehicle can attach by drilling holes in the vehicle and attaching the air flow device to the base of the window permanently, preferably with rubber in between the air flow device and the base of the window. It is advisable to use self-tapping screws. This arrangement permits the rear window to be closed or opened as desired.

Due to the design of the invention device, entry into the vehicle by an unwanted person is extremely difficult.

BRIEF DESCRIPTION OF THE DRAWINGS

Referring to the drawings in which numerals of like character designate similar parts throughout the several views.

DETAILED DESCRIPTION OF THE INVENTION

Figure 1:
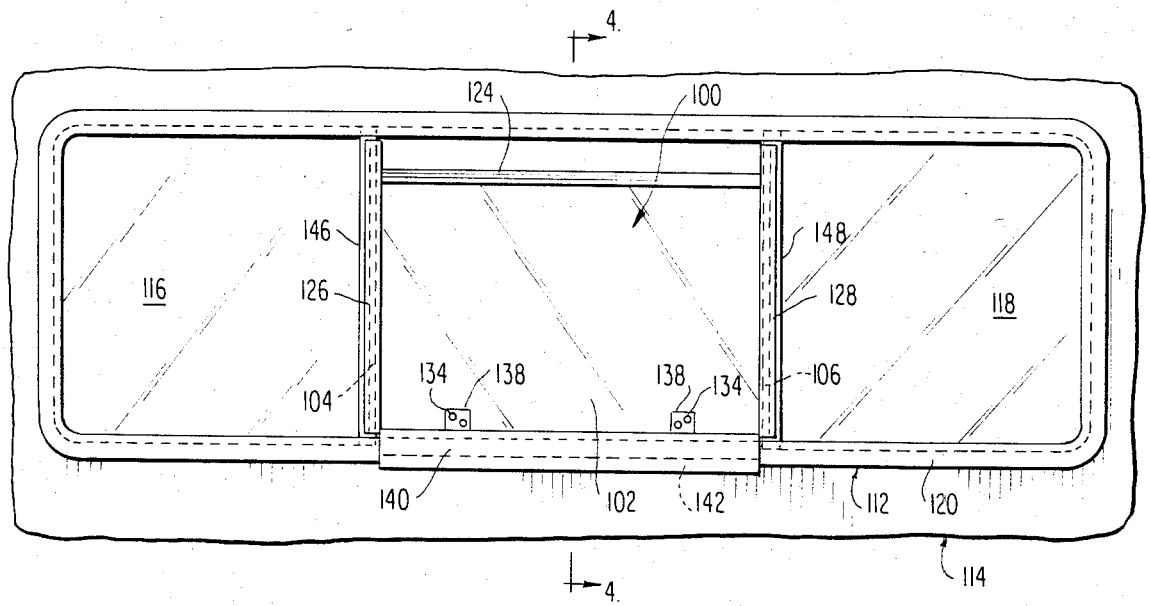
FIG. 1 is a front elevational view of the air flow device of an embodiment of the invention mounted in a car window.

The preferred embodiments of the invention are illustrated in the drawings.

Figure 2:
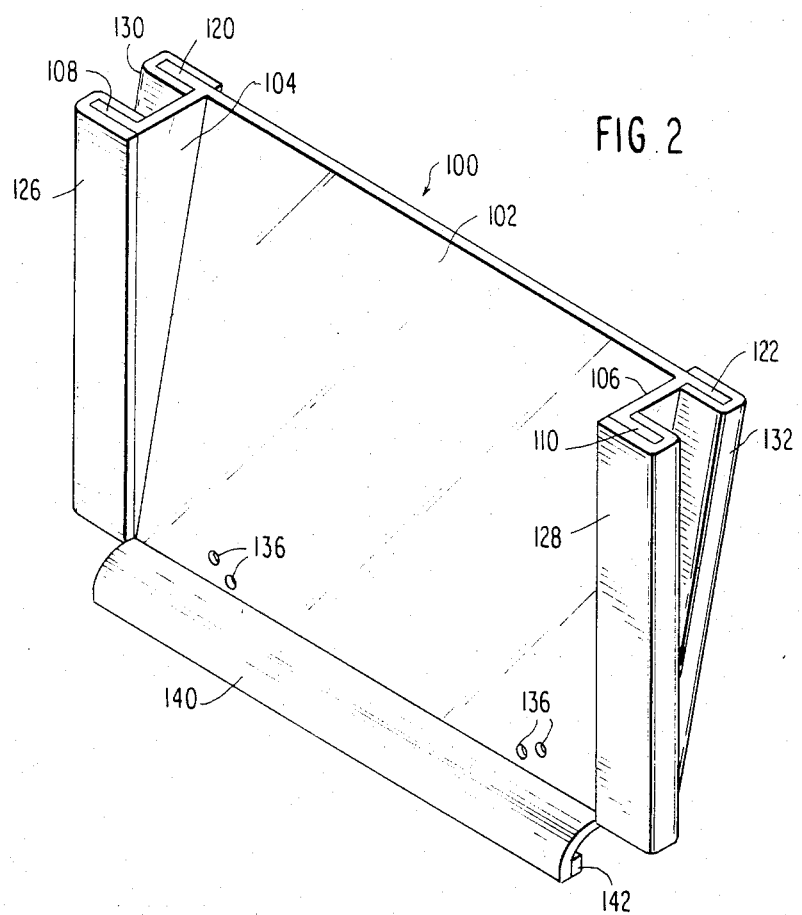
FIG. 2 is a perspective view of the device of FIG. 1.

In FIG. 1, numeral 100 represents the air flow device of an embodiment of the invention. Device 100 is completely made of a clear material, except for any screen, pads, hinges and other indicated parts. As best seen in FIG. 2, device 100 includes main plate 102, side plates 104 and 106, edge strips 108 and 110, and narrow side wings 120 and 122. Narrow side wings 120 and 122 can be part of plate 102 when sides 104 and 106 are mounted in from the edges of plate 102. The top rim of main plate 102 is offset from the front edge of side plates 104 and 106. The angle of such offset is preferably 20 degrees, but can generally be between 5 and 30 degrees, or so. The angle of offset is critical to the extent that sufficient air inflow is allowed and the angle does not become excessive, hence harmful to the passenger and destroying the desired air flow pattern. Side plates 104 and 106 are triangular shaped.

Rear window 112 of vehicle 114 has two stationary outer window sections 116 and 118 mounted in conventional window frame 120. There is an opening between outer window sections 116 and 118 in which air flow device 100 is permanently mounted.

Figure 3:
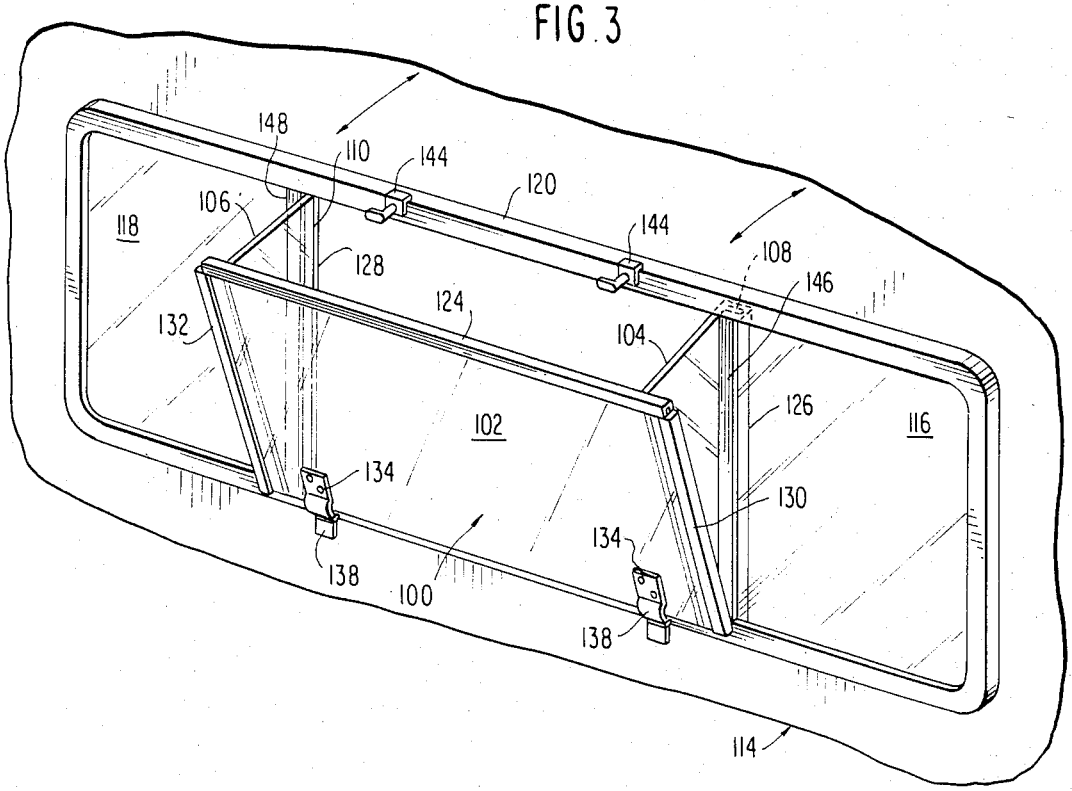
FIG. 3 is a back elevational view of the air flow device of FIG. 1 mounted in a car window.
Figure 4:
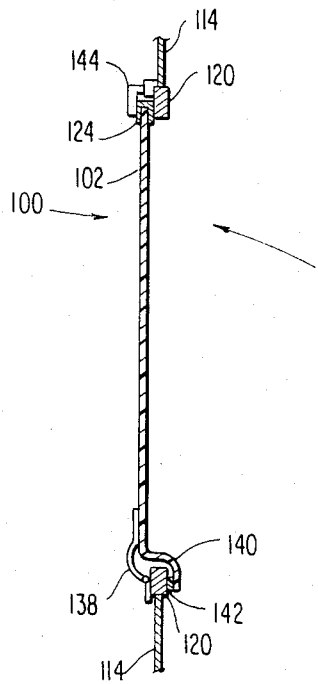
FIG. 4 is a front partial sectional view along line 4—4 in FIG. 1.

Edge strips 108 and 110 are mounted on side plates 104 and 106, respectively. Rubber groumets 126 and 128 are affixed over edge strips 108 and 110, respectively, and rubber groumets 130 and 132 are affixed to narrow side wings 120 and 122, respectively, as shown in FIG. 2. Metal edge 124 (inverted-U-shaped) can be mounted on the top edge of plate 102 with slots provided for sides 104 and 106—see FIG. 3. Main plate 102 is attached by rivets 134 (through holes 136) to hinges 138 which are permanently affixed by metal screws to vehicle 114 as shown in FIGS. 3 and 4. Apron or drip edge 140 extends outwards and downwards from the front edge of plate 102 as shown in FIG. 2. Rubber rim 142 is mounted on the inside bottom lip of apron 140 and contacts the side of car 114 when plate 102 is in the upright position. Swivel hatches 144 are mounted on the inside of the top rim of window frame 120 and hold window device 100 (i.e., plate 102) in the upright, locked position shown in FIG. 4.

Edges 108 and 110 are located outside of window sections 116 and 118. Accordingly, edges 108 and 110 prevent device 100 from being moved in any further, as shown in FIG. 3. Device 100 is constructed of a material which is flexible enough to allow device 100 to be forced into position in the window in FIGS. 1 and 3. Groumets 126 and 128 help seal the interface between the edges of device 100 and the inner edges of window sections 116 and 118 when device is in its fully open position. Vertical pillars 146 and 148 on the backside of the edges of window sections 116 and 118, respectively, reinforce the region and prevent someone from kicking in device 100 for unlawful entry into vehicle 114. Wings 120 and 122 are located inside of window sections 116 and 118, and prevent device 100 from being pulled out of window frame 120.

When in the closed position, main plate 100 is in the plane window sections 116 and 118. Latches 144 lock device 100 in the closed position. Other latching, locking or fastening means can be used in place of latches 144. In the closed position, side plates 104 and 106 extend outwards from the vertical plane of window sections 116 and 118.

By adjusting the position of main plate 102 from the plane of window sections 116 and 118, the flow of air in vehicle 114 can be adjusted. Rubber groumets (not shown) mounted on the top edges of sides 104 and 106 provide enough friction with the edges of window sections 116 and 118 to hold plate 102 in the desired position.

Main plate 102, side plates 104 and 106 and end strips 106 and 108 are preferably constructed of Uvex ®, a durable plastic which is flexible to a degree but is break-resistant. Any other suitable transparent plastic (e.g., plexiglass) or the like can also be used.

Concerning U.S. Pat. No. 1,895,109 (Suddards), the stated air flow pattern is the reverse of the air flow pattern of the air flow device of the invention. In a recreation vehicle containing a camper mounted on the bed of a pick-up truck, the passengers are permitted to ride in the camper. With the air flow device of the invention the driver is able to communicate with those riding in the camper.

In the 1930's safety regulations were different. With Suddards' ventilator, the view is obstructed for rear view traffic for the driver—this is not so with air flow device of the invention.

1930's vehicles had many holes in the floor, e.g., with the clutch, foot brake, hand brake, floor shifting and battery case; this permitted Suddards to draw air and fumes up through the vehicle's floor. With all windows closed, this allowed Suddards to form a vacuum in the vehicle thus permitting all of the air to be drawn up through the floor of such vehicles. With the air flow device of this invention, there is no vacuum. With the invention, fresh flow of air over the recreation vehicle enters all the time thus making the recreation vehicle very comfortable and the air pleasant. Suddards' ventilator is like an exhaust fan; it draws the air out from all three sides. The air flow device of the invention is not an exhaust exit or an air exit; the air from the air flow device is drawn in and distributed in the cab of the vehicle.

The air flow device of the invention is one solid component; it requires no cables, chains, rods or louvers to operate; it is made of a solid material (with only a possible cap or flap on top of the device).

The purpose of the air flow device of the invention is to supply the driver and/or passengers in the vehicle with a continuous supply of air. This is accomplished without the use of louvers on its structure. When vehicle side windows are closed, Suddards' device is not in use in modern vehicles with the side windows open or closed, the air flow device of the invention provides a continuous flow of air. In pick-up trucks, the rear window is located higher than the driver or passenger thus permitting the air to flow over and above the heads of the occupants of such vehicles.

In the air flow device, all metal to metal joinders are preferably welds. Preferably, non-abrasive padding material (strips) are provided for all surfaces in contact with paint.

Some of the advantages of the air flow device of the invention are: flow of air over the head of a passenger and stops the blowing of hair and prevents sore necks, shoulders, arms, etc.; there are no drafts, no water from rain can enter the cab, no water enters the cab while the truck (motor vehicle) is in motion or is standing still;

prevents windows from fogging up in a rainstorm (when the motor vehicle is moving); even with the side windows closed, there is continuous air flow; there is better control of the air flow in the cab of the truck (motor vehicle) while driving; if the weather permits and a person is using the invention air flow device, there is a strong possibility that no carbon monoxide poisioning can enter the vehicle due to the fact that the rear window is open and has a flow of air therethrough; and if all of the air flow device located in the rear window itself is made of plexiglass, one can see through all of the rear windows.

As used herein the term motor vehicle includes pick-up trucks, flat bed trucks, vans, four-wheel drive vehicles (flat backed), truck cabs, pick-up trucks and the like with campers mounted thereon, truck trailers, and recreation vehicles including travel trailers, motor homes and campers. As used herein the term boats includes those having a vertical, flat rear wall on the cabin.

When using the air flow device, there is less chance of carbon monoxide poisoning in the cab of the vehicle due to the continuous flow of air. Some vehicles have faulty exhaust systems and while driving carbon monoxide may enter the vehicle; however, by using the device there is a continuous flow of air which prevents the driver from becoming nauseated or becoming sleepy, thereby preventing an accident. Flow of air is directed along the top of the vehicle cab preventing sore necks, shoulders, arms, etc., and preventing occupant discomfort (e.g., stops the blowing of hair). The device eliminates drafts in cab of vehicle. When the device if used, no water from rain can enter cab of vehicle via the rear window (regardless of whether vehicle is in motion or standing still). The device prevents windows from fogging in a rainstorm while the vehicle is in motion. Even with the side windows of the cab closed, the device still permits continuous air flow with rear window open. The device causes better air quality in cab of vehicle while driving. The device is maintenance free or requires little maintenance (e.g., no rusting, no painting, no parts to replace, no adjustment, long lasting and durable). Even though installed in the rear window of a vehicle, sight traffic to the rear (i.e., rear view) is not impaired. The device cannot be removed from the outside of vehicle, which makes unauthorized entry through the rear window extremely difficult at best.

What is claimed is:

1. An air flow device for a closed motor vehicle or boat for positioning in the rear aperture thereof which comprises (i) a plate that is transparent in at least the central region thereof, (ii) means for attaching said air flow device to said rear aperture, said attachment means including pivot means which is pivotally attached between the bottom portion to said plate and to the lower rim of said aperture, (iii) two vertical side members, each of which is attached to an end of said plate so as to extend outwardly from said plate, each of said vertical side members being in sliding relationship with one of the vertical sides of said rear aperture and/or of window glass mounted in said rear aperture, and (iv) two narrow end members, each of which is attached to an unoccupied end of one of said vertical side members and extends away from said plate, when said plate is in an upright position so as to close said rear aperture, said vertical side members extend outwards from said rear aperture of said vehicle or boat, and when said plate is in an inwardly pivoted position so as to extend upwardly and inwardly from said rear aperture, thereby forming a gap between the top of said plate and the vertical plane of said rear aperture, said vertical side members extend inwardly from said rear aperture thereby preventing lateral air flow into said vehicle or boat, said end members preventing the inwards pivoting of said device beyond the outer edges of said side members.

2. An air flow device as claimed in claim 1 wherein there are two narrow side wings, each of which is attached to one end of said plate and extends away from said plate, when said plate is in an upright position said two narrow side wings prevent the inward movement of said device beyond the inner edges of said narrow side wings.

3. An air flow device as claimed in claim 2 wherein a rubber groumet is affixed on each of said narrow end members and said narrow side members.

4. An air flow device as claimed in claim 1 wherein a top cover is removably attached to the top edge of said plate and said side members when said device is in the open position, thereby providing a movable cover for said gap.

5. An air flow device as claimed in claim 1 wherein said plate is essentially flat.

6. An air flow device as claimed in claim 1 wherein all of the said plate is transparent.

7. In combination, a closed motor vehicle or boat, said motor vehicle or boat having a rear aperture, and an air flow device mounted in said rear aperture, said air flow device comprising (i) a plate that is transparent in at least the central region thereof, (ii) means for attaching said air flow device to said rear aperture, said attachment means including pivot means which is pivotally attached between the bottom portion to said plate and to the lower rim of said aperture, (iii) two vertical side members, each of which is attached to an end of said plate so as to extend outwardly from said plate, each of said vertical side members being in sliding relationship with one of the vertical sides of said rear aperture and/or of window glass mounted in said rear aperture, and (iv) two narrow end members, each of which is attached to an unoccupied end of one of said vertical side members and extends away from said plate, when said plate is in an upright position so as to close said rear aperture, said vertical side members extend outward from said rear aperture of said vehicle or boat, and when said plate is in an inwardly pivoted position so as to extend upwardly and inwardly from said rear aperture, thereby forming a gap between the top of said plate and the vertical plane of said rear aperture, said vertical side members extend inwardly from said rear aperture thereby preventing lateral air flow into said vehicle or boat, said end members preventing the inwards pivoting of said device beyond the outer edges of said side members.

* * * * *